United States Patent
Seid et al.

(10) Patent No.: US 9,518,679 B2
(45) Date of Patent: Dec. 13, 2016

(54) SOLENOID TRANSMISSION HYDRAULIC MODEL METHOD

(71) Applicant: FLEXTRONICS AP, LLC, Broomfield, CO (US)

(72) Inventors: David Seid, Conklin, MI (US); Ritchie Wycoco Baje, Cebu (PH); Hamid Najmolhoda, Grand Rapids, MI (US)

(73) Assignee: Flextronics AP, LLC, San Jose, CA (US)

(*) Notice: Subject to any disclaimer, the term of this patent is extended or adjusted under 35 U.S.C. 154(b) by 241 days.

(21) Appl. No.: 14/221,996

(22) Filed: Mar. 21, 2014

(65) Prior Publication Data
US 2015/0267840 A1    Sep. 24, 2015

(51) Int. Cl.
*G01L 19/04* (2006.01)
*G01L 7/00* (2006.01)
*G01M 3/02* (2006.01)
*F16K 37/00* (2006.01)
*G05D 16/20* (2006.01)

(52) U.S. Cl.
CPC ....... *F16K 37/0091* (2013.01); *G05D 16/2013* (2013.01)

(58) Field of Classification Search
None
See application file for complete search history.

(56) References Cited

U.S. PATENT DOCUMENTS

| | | | |
|---|---|---|---|
| 8,265,838 B2* | 9/2012 | Wilson | F16H 61/0251 477/34 |
| 2009/0281698 A1 | 11/2009 | Wilson | |
| 2010/0326543 A1* | 12/2010 | Boehm | F16D 48/02 137/487.5 |

FOREIGN PATENT DOCUMENTS

EP    0620377 A1    10/1994

* cited by examiner

*Primary Examiner* — Andre Allen
*Assistant Examiner* — Jermaine Jenkins
(74) *Attorney, Agent, or Firm* — Volpe and Koenig, P.C.

(57) ABSTRACT

A method is disclosed for determining off-temperature accuracy information of a solenoid fluid control valve. The method comprises performing a current sweep at a first temperature, and for at least one command pressure, determining an error in a control pressure based on the current sweep. The error may be determined at the first temperature. A metric may then calculated based on the current sweep, and a pressure error offset may be determined for a second temperature based on the metric. The pressure error offset may describe a difference between the error in control pressure at the first temperature and an expected error in control pressure at the second temperature.

19 Claims, 11 Drawing Sheets

| | Pressure Error Offset (in kPa) | | | | | | |
|---|---|---|---|---|---|---|---|
| | 0.9* | 1.1* | 1.3* | 1.5* | 1.7* | 1.9* | 2.1* |
| 0 kPa | 0.000 | 0.000 | 0.000 | 0.000 | 0.000 | 0.000 | 0.000 |
| 76 kPa | -5.257 | -5.257 | -4.645 | -3.312 | 0.897 | 0.114 | -0.675 |
| 152 kPa | -3.718 | -3.718 | -3.126 | -1.723 | 0.999 | 0.292 | -0.661 |
| 228 kPa | -2.539 | -2.539 | -2.067 | -1.036 | 0.941 | 0.109 | -0.691 |
| 304 kPa | -1.538 | -1.538 | -1.206 | -0.644 | 0.914 | -0.278 | -0.777 |
| 380 kPa | -0.599 | -0.599 | -0.373 | -0.243 | 0.906 | -0.618 | -0.858 |
| 456 kPa | 0.344 | 0.344 | 0.454 | 0.234 | 0.890 | -0.790 | -0.931 |
| 532 kPa | 1.241 | 1.241 | 1.316 | 0.843 | 0.918 | -0.950 | -1.014 |
| 608 kPa | 2.176 | 2.176 | 2.281 | 1.779 | 0.966 | -1.034 | -1.114 |
| 684 kPa | 2.996 | 2.996 | 3.202 | 2.766 | 1.007 | -0.954 | -1.251 |
| 760 kPa | 3.496 | 3.496 | 3.895 | 3.781 | 1.102 | -0.454 | -1.310 |

\* FST factor in ml/min

SOLENOID TRANSMISSION HYDRAULIC MODEL METHOD

FIELD OF INVENTION

The present invention relates to determining off-temperature pressure accuracy of a solenoid fluid control valve.

BACKGROUND

Solenoid fluid control valves are often used to control fluid pressure in a variety of systems, including clutch mechanisms and other devices in an automobile. The environment in which these actuators must function may have a wide temperature range, leading to variation in the solenoid fluid control valve's response to a given command current. To monitor this variation, when a manufacturer supplies a solenoid fluid control valve to a customer, the customer may request pressure accuracy information for a variety of temperatures. While the pressure accuracy information may be quickly obtained at a single temperature, performing an accuracy audit at a variety of temperatures may be time-consuming and inefficient.

SUMMARY

A method is disclosed for determining off-temperature accuracy information of a solenoid fluid control valve. The method comprises performing a current sweep at a first temperature, and for at least one command pressure, determining an error in a control pressure based on the current sweep. The error may be determined at the first temperature. A metric may then calculated based on the current sweep, and a pressure error offset may be determined for a second temperature based on the metric. The pressure error offset may describe a difference between the error in control pressure at the first temperature and an expected error in control pressure at the second temperature.

DETAILED DESCRIPTION OF THE PREFERRED EMBODIMENTS

The solenoid actuator manufacturing process introduces variations in solenoid performance and response. These variations may be particularly pronounced at extreme temperatures. When a solenoid actuator is used in an automobile transmission, error in the output pressure for a given command current may result in lower shift quality. Accordingly, when a product is provided to a customer, the customer may request an off-temperature audit to confirm that the solenoid performs satisfactorily at a variety of temperatures.

A typical solenoid fluid control valve may have a coil, and an armature that moves in response to a current through the coil. The motion of the armature may result in the motion of a spool that regulates fluid flow from a supply port to a control port. The fluid pressure at the control port, knows as the "control pressure," may be measured as a function of the current through the solenoid's coil.

In the prior art, a temperature audit of a solenoid fluid control valve may entail testing the valve's performance at a variety of temperatures. The valve may be placed in an environment set at a certain temperature, and a current sweep may be performed. As the current through the coil of the solenoid fluid control valve is increased and then decreased, the resulting control pressure for the changing current may be recorded. This information, or transfer function, may be used immediately to perform the audit. The audit may focus on a discreet number of control pressures chosen by the customer. For each of the control pressures, the corresponding current as indicated by the transfer function may be applied to the solenoid fluid control valve. The difference between the expected control pressure and the measured control pressure may be required to fall within an acceptable error range.

The temperature audit process can be time consuming, often requiring a few days for the audit of the solenoid fluid control valve to be requested, performed, and analyzed. The audit may also require the use of cold and hot chambers for taking data at various temperatures. These chambers may not always be available, further slowing the auditing process. While the audit may provide accurate data for the valve being tested, the information only applies to a single solenoid fluid control valve at the particular temperature that was tested. Accordingly, the process is highly inefficient when applied to a large quantity of solenoid fluid control valves at a variety of temperatures.

The inventive temperature accuracy audit method uses control pressure and flow signature data for a solenoid fluid control valve at a characterization temperature to determine a pressure error offset at a variety of other temperatures. The method may be used by a manufacturer to efficiently provide accuracy information to a customer. The information may be provided in the form of software. The customer may enter information into a plurality of required fields and the software may calculate an accuracy offset.

Figure 1:
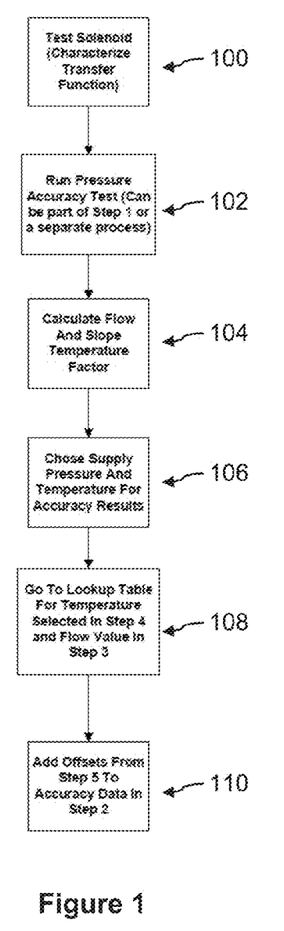
FIG. 1 shows an overview of the inventive temperature accuracy method.

Referring to FIG. 1, the temperature accuracy method may begin with a sweep of the command current for a particular solenoid fluid control valve, and the corresponding control pressure and fluid flow for a plurality of command currents may be recorded (step 100). A pressure accuracy test may then be run to test the error in the command pressure (step 102). This step may be performed as part of step 100, or as a separate process. A flow and slope temperature (FST) factor may be calculated based on the data collected during the command current sweep (step 104). This step may be performed by software provided to the customer. A supply pressure and temperature may then be chosen for the accuracy results (step 106). The supply pressure and temperature may be chosen by the customer and input to the software provided by the manufacturer. A lookup table may be used to determine a pressure error offset for the chosen supply pressure and temperature (step 108). This step may also be performed by the software. Finally, the pressure error offset may be applied to the accuracy data collected in step 102 to determine an expected pressure error at the chosen temperature (step 110). The software may provide the pressure error offset or the expected pressure error to the user. The method is described in detail below.

Figure 2:
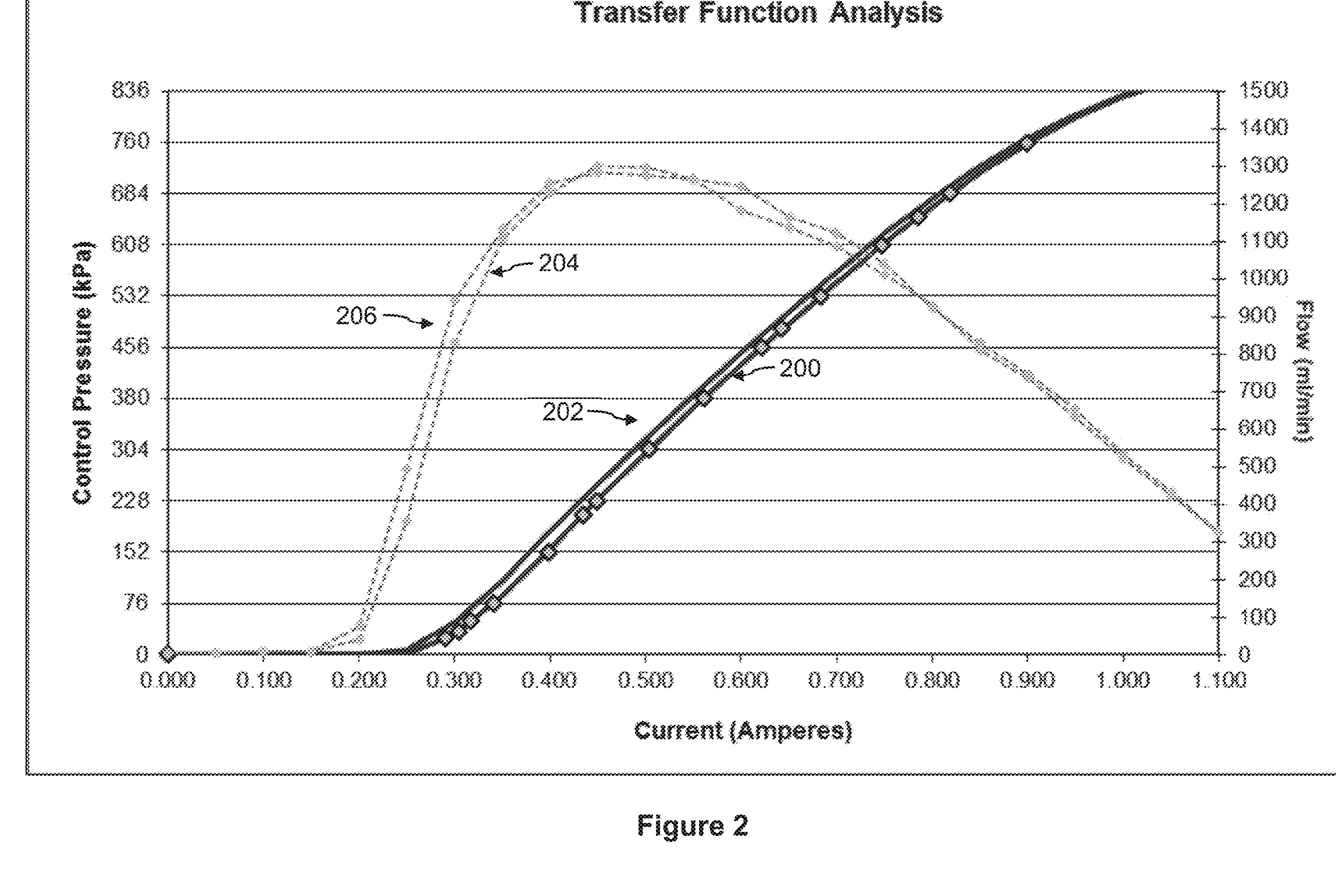
FIG. 2 shows control pressure and fluid flow versus command current for a solenoid fluid control valve operated at 70° C.

Referring to FIG. 2, the method begins with a sweep of the current supplied to the solenoid fluid control valve's coil. This current is referred to herein as the "command current." The sweep may be performed at a temperature that is close to a normal operating temperature of the solenoid fluid control valve's environment. For example, if the solenoid fluid control valve is to be used in an automobile transmission, the sweep may be performed at the normal operating temperature of a transmission, approximately 70° C.-80° C. The sweep may also be performed with a pressure at the valve's supply port, i.e., "supply pressure," that is close to the valve's supply pressure under normal operating conditions. The data in FIG. 2 corresponds to a supply pressure of 896 kPa, and a temperature of 70° C. The curve 200 shows control pressure versus command current for an increasing command current. As current is applied to the solenoid fluid control valve, the armature becomes displaced, allowing a fluid flow through the valve that results in a non-zero control pressure. The curve 202 shows control pressure versus command current for a decreasing command current. The curves 204, 206 show the fluid flow versus command current for the increasing and decreasing command current, respectively.

Figure 3:
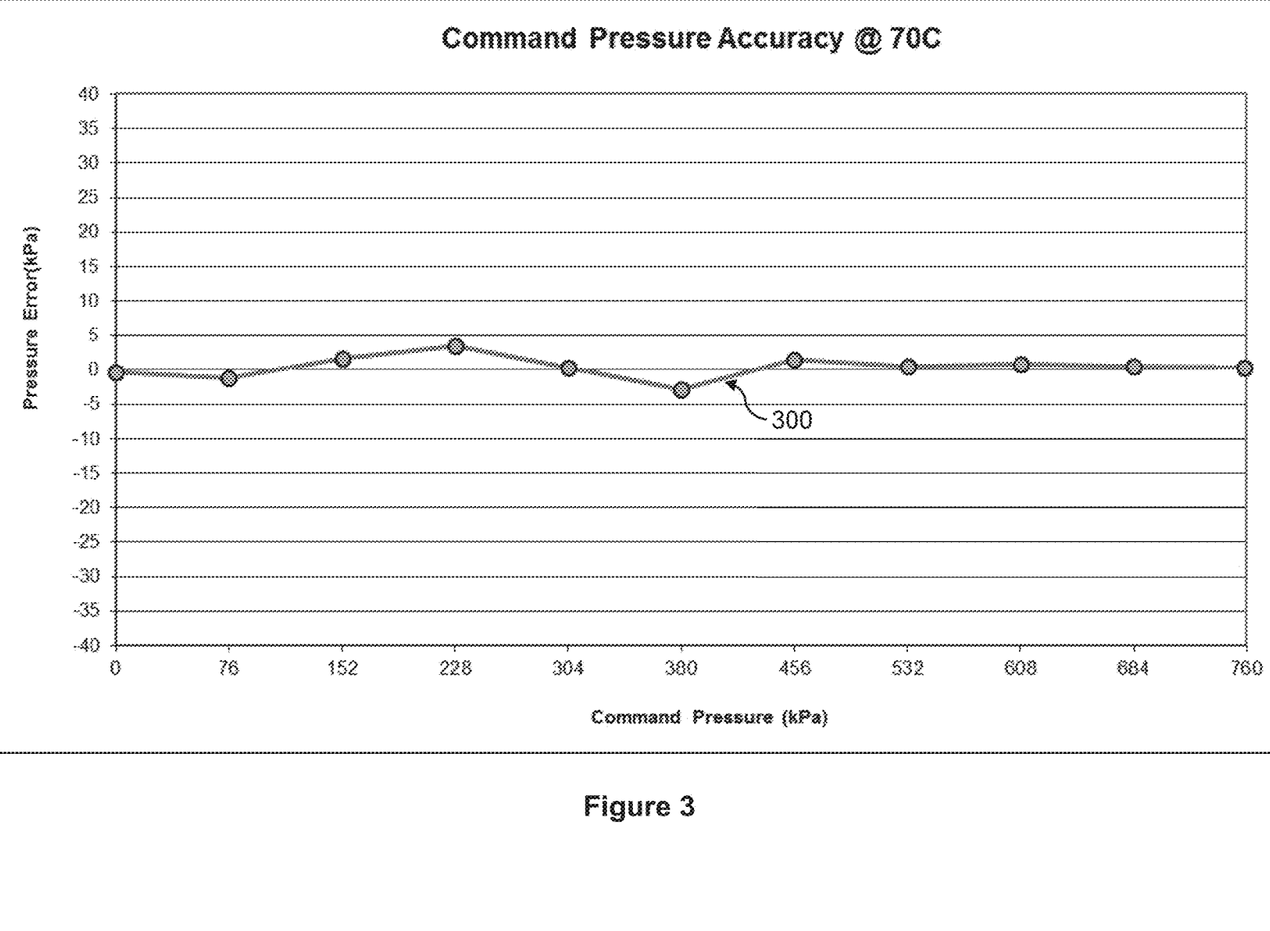
FIG. 3 shows pressure error versus command pressure for a solenoid fluid control valve operated at 70° C.

Next, an audit is performed at the characterization temperature to measure the accuracy of the command current versus control pressure data shown in FIG. 2. A set of control pressures is chosen, and for each control pressure, the command current expected to produce that control pressure is applied to the solenoid. Because the chosen control pressures will be "commanded" by applying the corresponding command currents, they are referred to as "command pressures." The resulting control pressure for each of the command pressures is measured, and the difference between the command pressure and measured control pressure is calculated. This difference is referred to as the "pressure error." An example of the pressure error versus command pressure data 300 is shown in FIG. 3. As shown in FIG. 3, not all of the data point shown in FIG. 2 may be accuracy tested.

Once the accuracy test has been performed, the control pressure and flow data shown in FIG. 2 may be analyzed to determine a flow and slope temperature (FST) factor. The FST factor is given by $$FST \text{ factor (ml/min)} = \frac{slope_{liftoff}(\text{kPA/A})}{slope_{max}(\text{kPA/A})} * flow_{peak}(\text{ml/min}), \quad \text{Equation (1)}$$

where $slope_{liftoff}$ is the average slope of the control pressure versus command current curve in a liftoff region of the current sweep, and $slope_{max}$ is the maximum value of the slope of the control pressure versus command current curve over the whole current sweep. $flow_{peak}$ is the peak fluid flow, the maximum value of the fluid flow through the valve.

Figure 4:
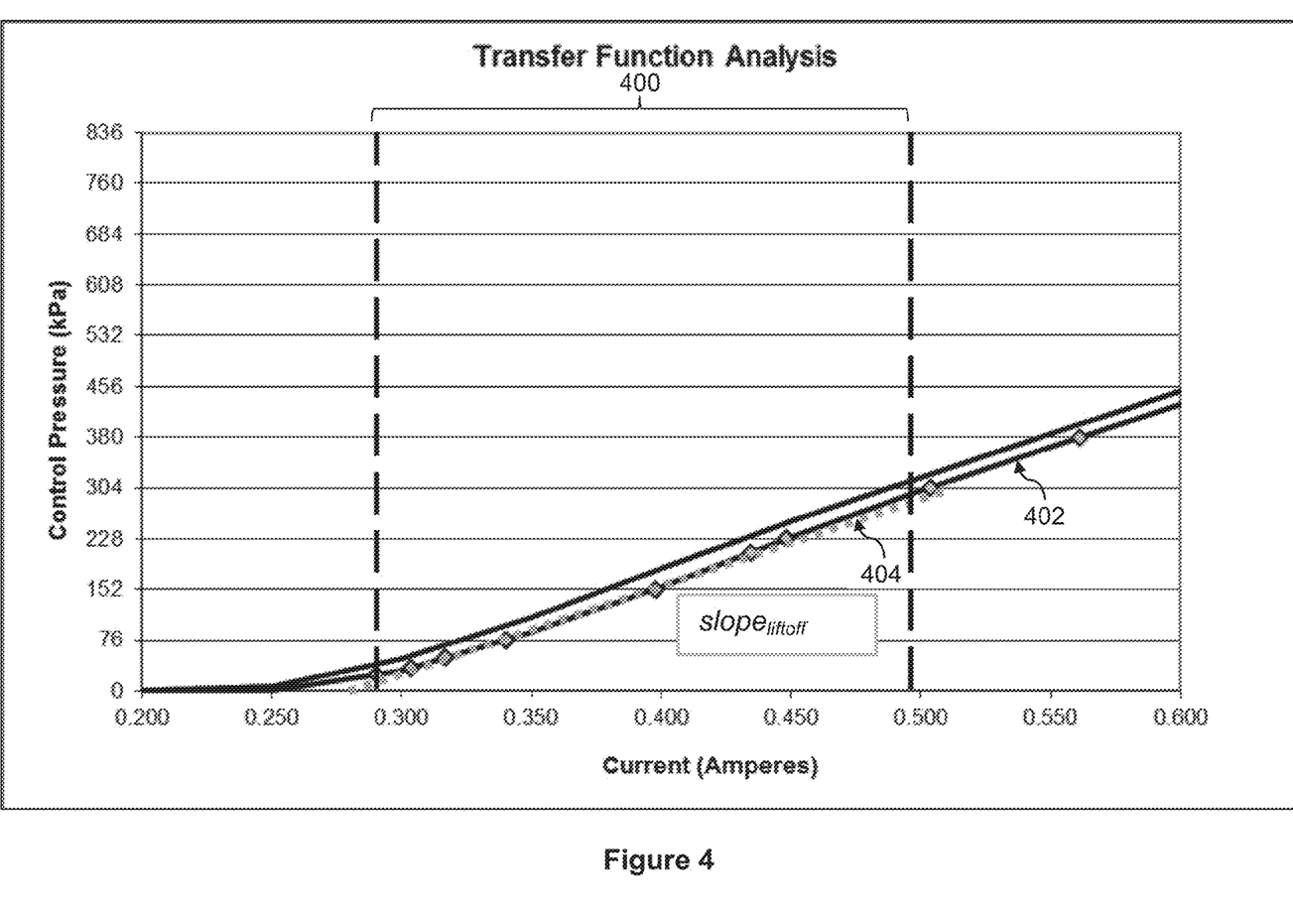
FIG. 4 illustrates the average slope, $slope_{liftoff}$, in the liftoff region of a control pressure versus command current curve.
Figure 5:
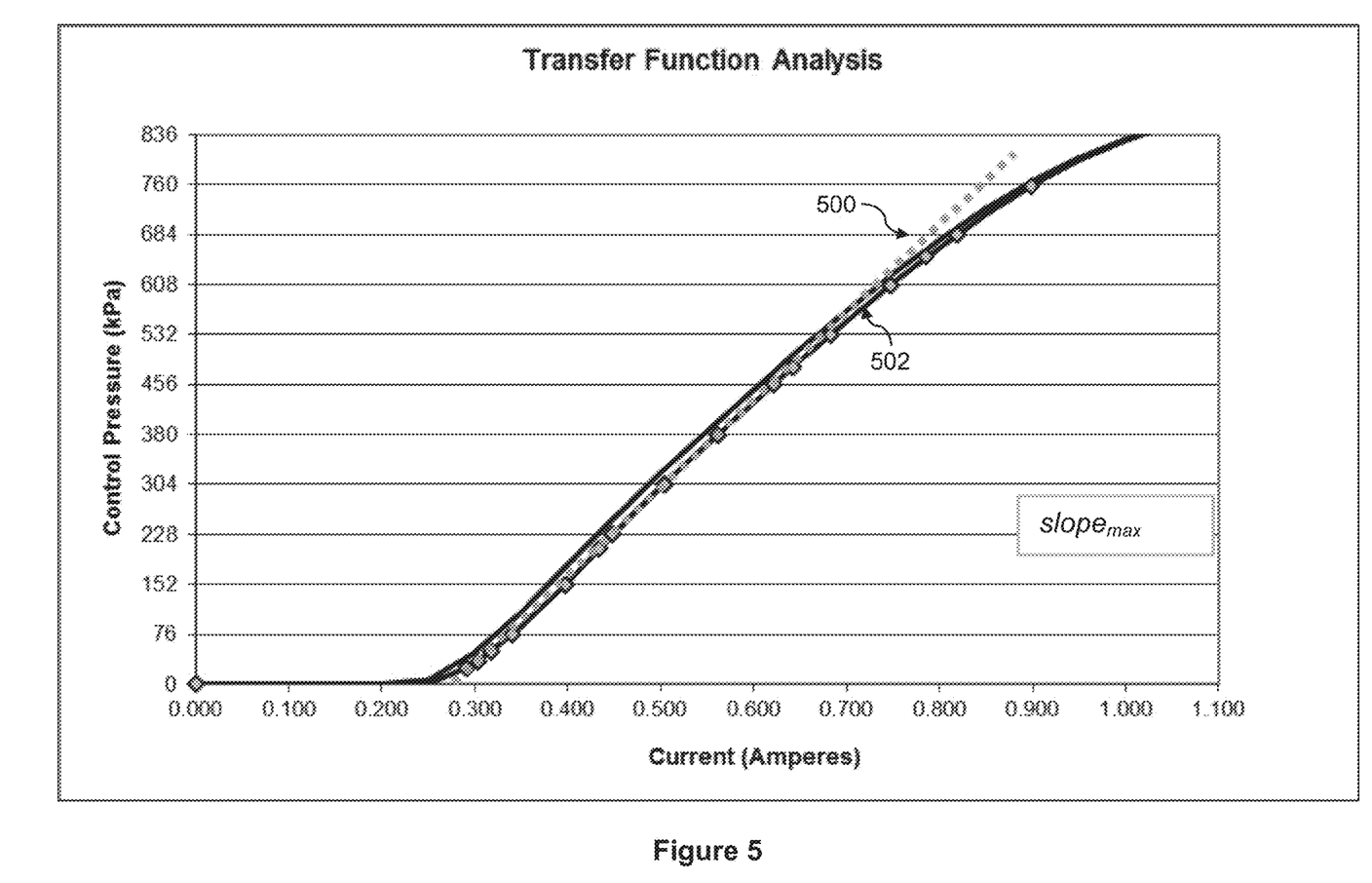
FIG. 5 illustrates the maximum slope, $slope_{max}$, of a control pressure versus command current curve.

FIG. 4 shows the liftoff region 400. An average slope, $slope_{liftoff}$, of the command current versus control pressure curve 402 for increasing control pressure is determined for the liftoff region 400. The liftoff region 400 is generally bounded by the command current required to open the fluid control valve, and the command current corresponding to the peak flow. The dashed line 404 illustrates a line whose slope equals $slope_{liftoff}$, the average slope of curve 402 in the liftoff region 400. FIG. 5 shows the full current sweep shown in FIG. 2, and the dashed line 500 has a slope equal to $slope_{max}$, the maximum slope at any point in the control pressure versus command current curve 502 for an increasing command current.

The FST factor of Equation 1 takes into account the fact that the slope of the control pressure versus command current curve in the liftoff region, $slope_{liftoff}$, may not be equal to the maximum slope of the curve over the whole current sweep, $slope_{max}$. The FST factor also takes into account the fluid flow through the valve, depending directly on the peak flow.

Once the FST factor is calculated, a look-up table may be used to determine command pressure accuracy information at temperatures and supply pressures other than the characterization temperature and supply pressure. The look-up table may be based on an average of measurements recorded for a large number of solenoid fluid control valves. Each valve may undergo the current sweep and temperature audit at a variety of temperatures, not just the characterization temperature. An FST factor may also be calculated for each valve based on data taken at the characterization temperature. A table may then be created with information for a variety of off-temperatures, temperatures not equal to the characterization temperature. For each off-temperature, the FST factors and audit information for large quantity of valves may be combined to create a look-up table for that temperature.

Figure 6:
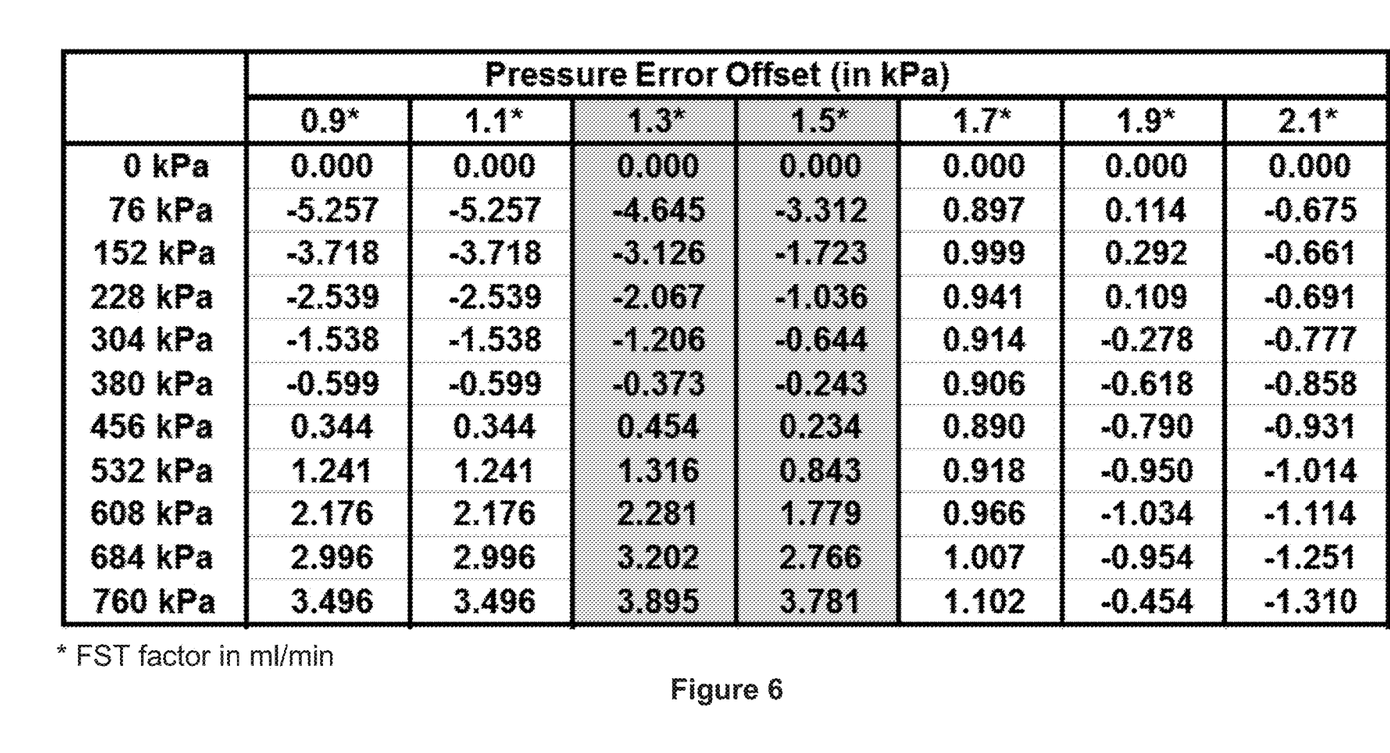
FIG. 6 shows a look-up table giving pressure error offsets as a function of a command pressure and a flow and slope temperature (FST) factor.

The supply pressure may also be varied, and the look-up tables may be defined for a specific supply pressure as well as temperature. An example table is shown in FIG. 6 for a temperature of 110° C. and a supply pressure of 896 kPa. A pressure error offset is given based on the FST factor (top row) and the command pressure (left-most column).

Referring to the table in FIG. 6, for a command pressure of 228 kPa in a solenoid with an FST factor of 1.3 ml/min, a pressure error offset of −2.067 kPa may be expected. FIG. 6 shows the pressure error offset for ten additional command pressures. The pressure error offsets may be applied to the command pressure accuracy plot in FIG. 3 to estimate a command pressure error at 110° C. This concept is illustrated in FIG. 7.

Figure 7:
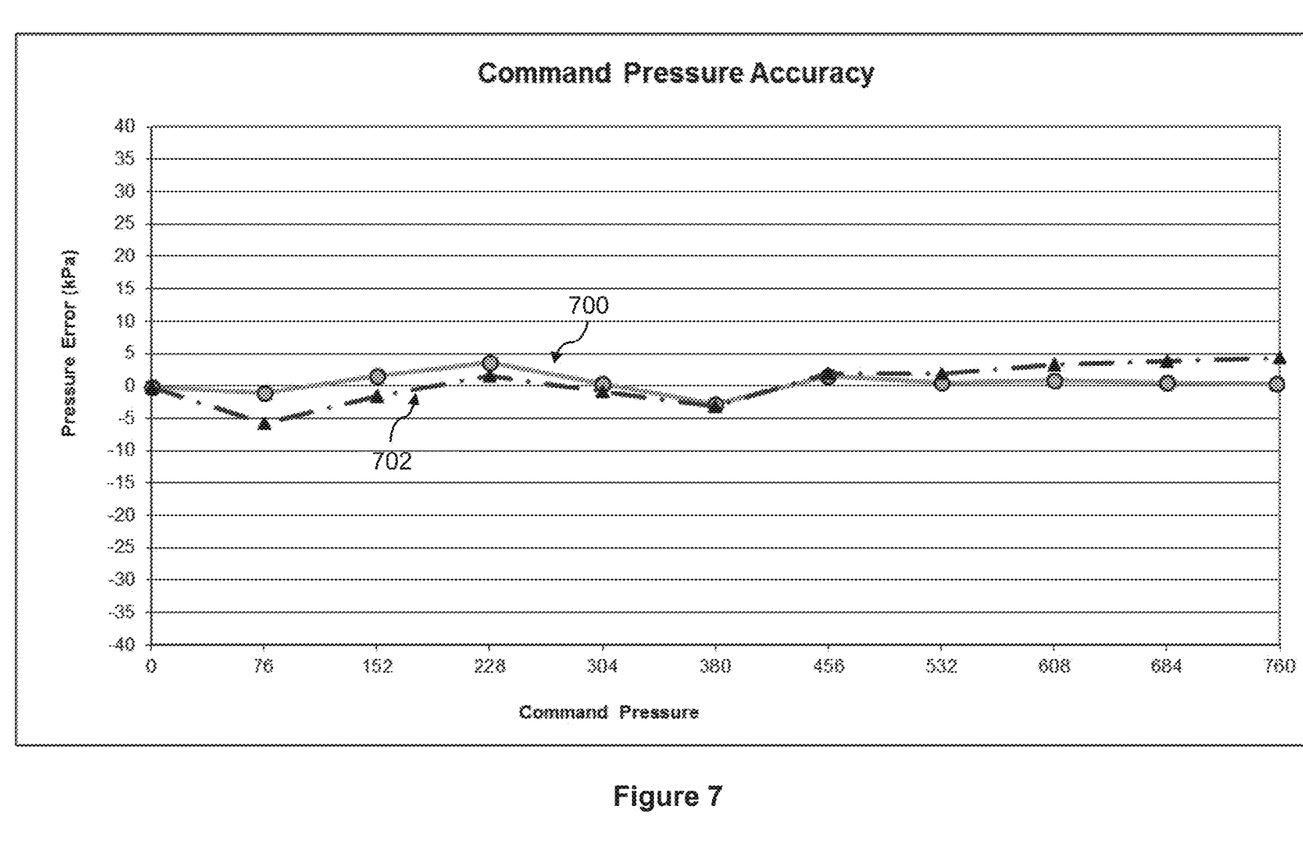
FIG. 7 shows a measured pressure error versus command pressure for a solenoid fluid control valve operated at 70° C. and an expected pressure error versus command pressure for a solenoid fluid control valve operated at 110° C.

FIG. 7 shows the pressure error versus command pressure 700 for a solenoid at 70° C. This data, also shown in FIG. 2, is taken after the initial sweep of the solenoid is performed. FIG. 7 also shows the expected pressure error versus command pressure 702 for solenoid at 110° C. This data has not been directly measured, but has been estimated using the method described above. The table in FIG. 6 provides an expected difference, or offset, between each pair of data points in FIG. 7. For a command pressure of 228 kPa and an FST factor of 1.3, the table indicates a pressure error offset of −2.067. This means that at 110° C., the pressure error at 304 kPa may be expected to differ from the pressure error at 70° C. by −2.067 kPa.

The temperature accuracy data 300 in FIG. 3 indicates that for the particular solenoid fluid control valve being tested, the pressure error for a control pressure of 228 kPa at 70° C. is 3.5 kPa. This valve has an FST factor Of approximately 1.3 ml/min. The pressure error offset table in FIG. 6 indicates that at 110° C., the pressure error for the solenoid fluid control valve is 3.5 kPA−2.067 kPa=1.433 kPa.

While the table in FIG. 6 only shows data for a discreet set of command pressures and FST factors, pressure error offsets for other values may be determined from the information provided. For example, for an FST factor of 1.4 ml/min, an average of the pressure error offsets for FST factors 1.3 and 1.5 may be used. Additionally, more or fewer command pressures and FST factors may be included in the table.

Figure 8:
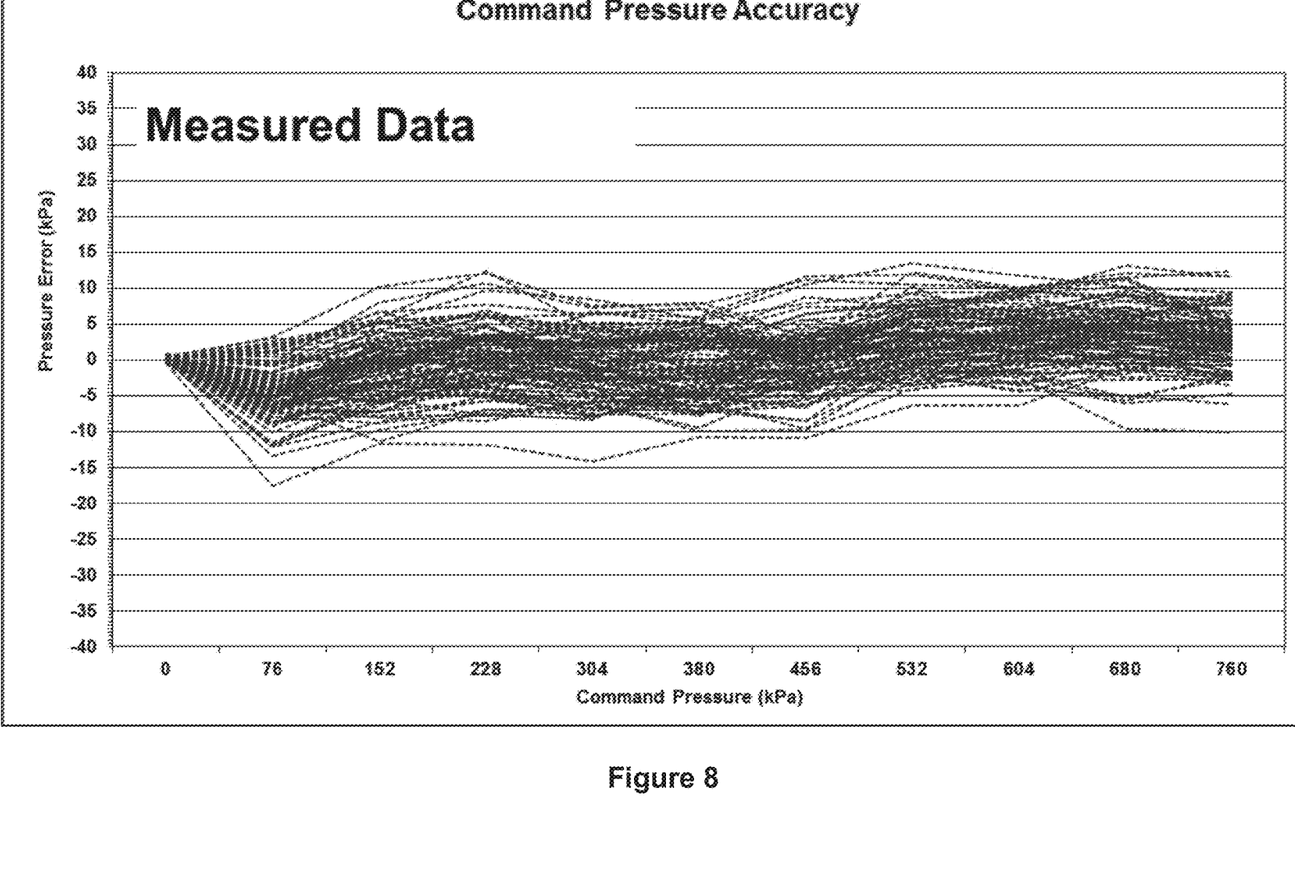
FIG. 8 shows a measured pressure error versus command pressure for 100 solenoid fluid control valves operated at 110° C.

FIG. 8 shows pressure error versus command pressure data for 100 solenoid fluid control valves operated at 110° C. For each line, a solenoid fluid control valve was placed in a 110° C. environment, and a first current sweep was performed. The pressure error was then measured based on the current sweep for 10 command pressures, still in the 110° C. environment.

Figure 9:
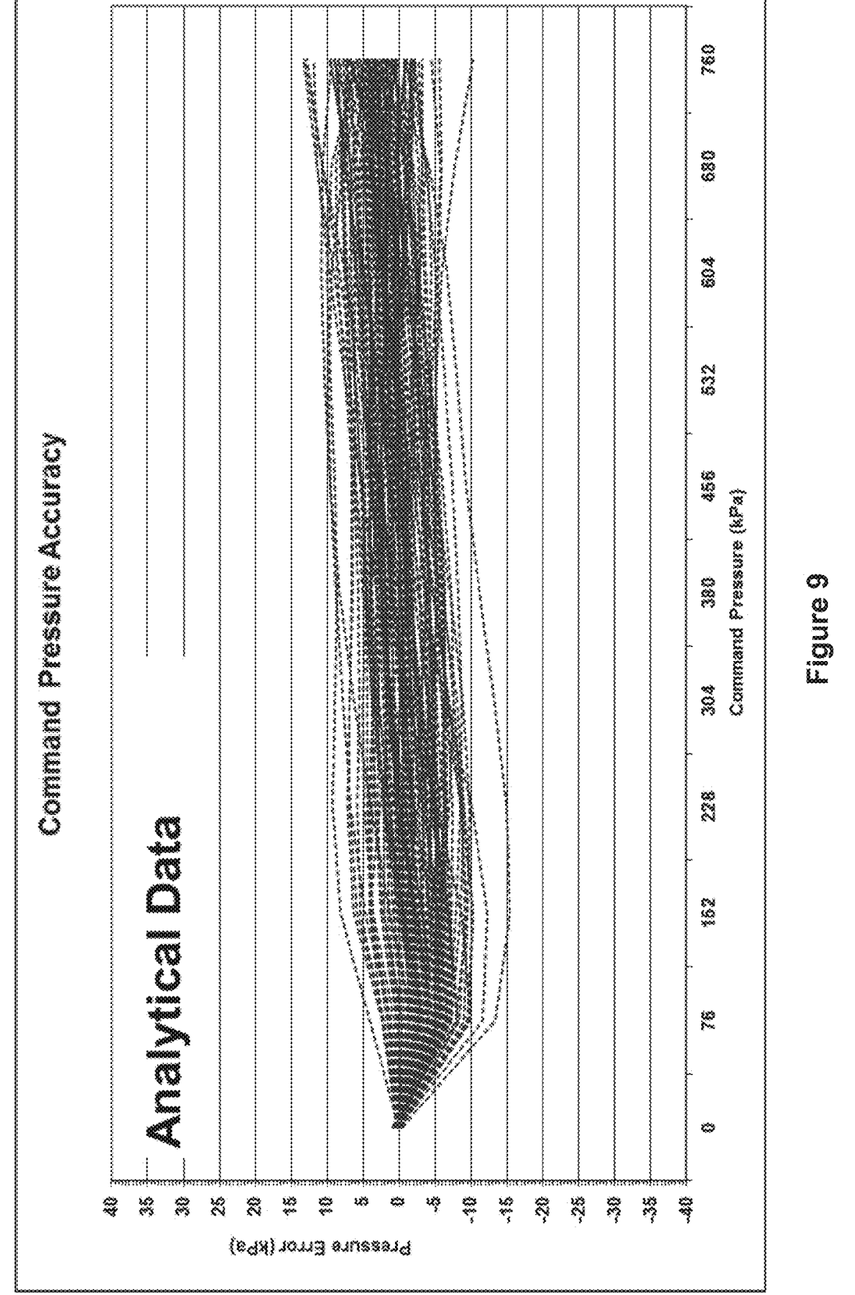
FIG. 9 shows an expected pressure error versus command pressure for 100 solenoid fluid control valves operated at 110° C.

FIG. 9 shows analytical data for the same 100 solenoid fluid control valves. The data in FIG. 9 has been calculated using the accuracy model described herein. For each line in FIG. 9, a solenoid fluid control valve was placed in a 70° C. environment, and a first current sweep was performed. The pressure error was then measured based on the current sweep for 10 command pressures, still in the 70° C. environment. The FST factor was calculated, and a pressure error offset was determined for each of the 10 command pressures based on a look-up table, such as the table shown in FIG. 6. This offset was added to the pressure error measured at 70° C. to estimate a pressure error at 110° C. The estimated pressure error is plotted as a function of command pressure in FIG. 9.

Figure 10:
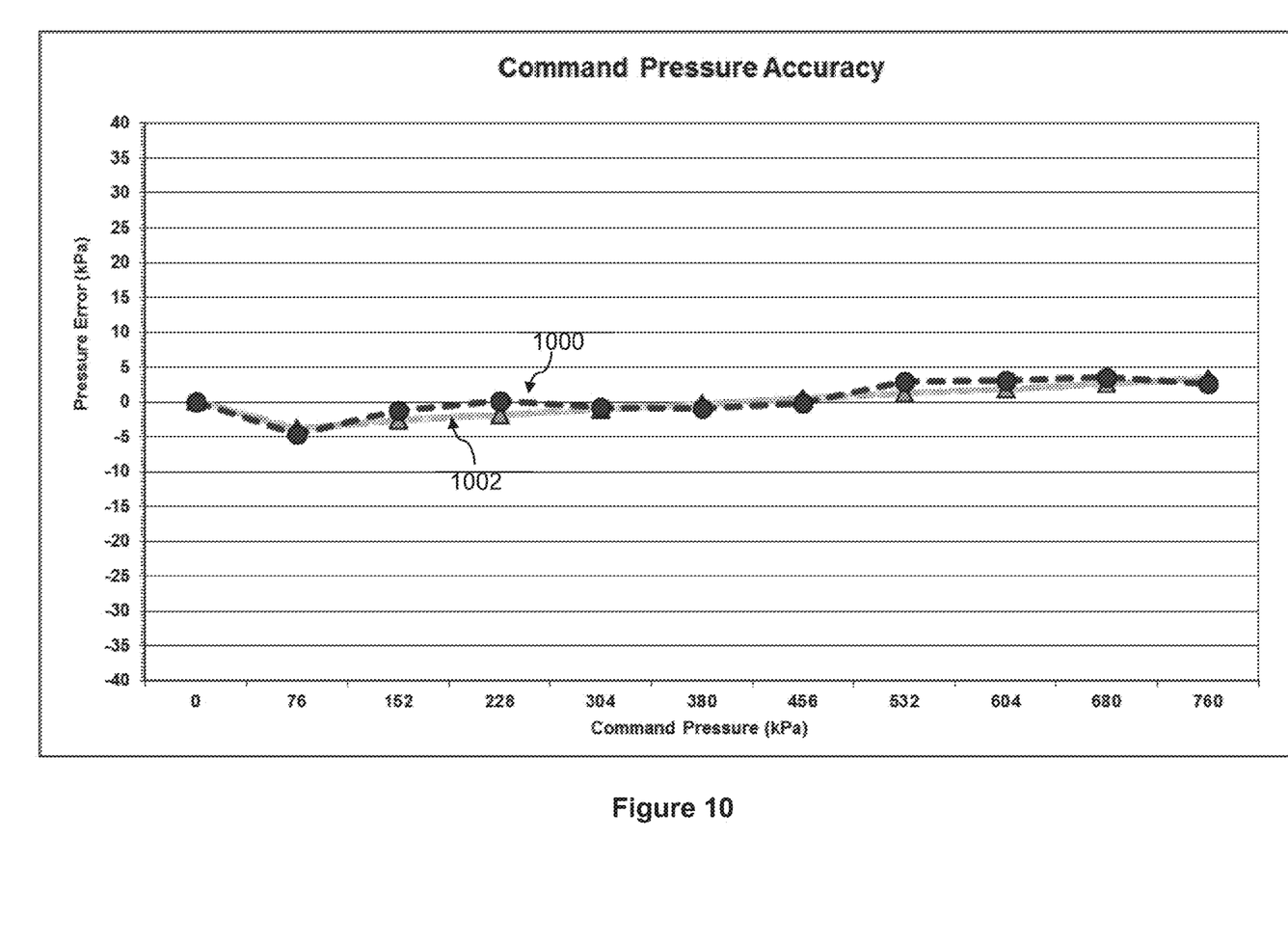
FIG. 10 shows an average of the measured data plotted in FIG. 8, and an average of the expected data plotted in FIG. 9.

The average of the 100 measured and estimated pressure errors is plotted in FIG. 10. The average of the measured data 1000 differs only slightly from the average of the estimated data 1002, indicating that the accuracy model provides a good off-temperature estimate of the pressure error.

Figure 11:
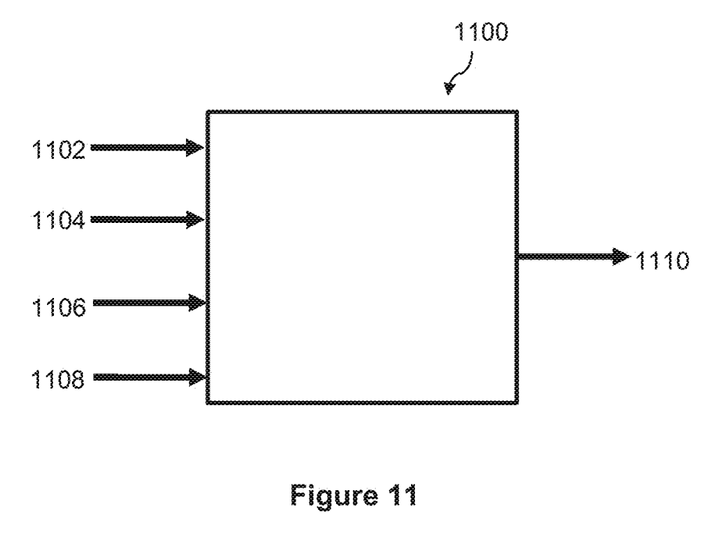
FIG. 11 shows an application specific integrated circuit (ASIC) that may be configured to perform the methods disclosed herein.

The methods described herein may be performed in part or in whole by software implemented on an application specific integrated circuit (ASIC) or any other type of processor. Referring to FIG. 11, the software may be implemented on an ASIC 1100 configured to receive as input the data 1102 from the sweep of the command current, the data 1104 from the pressure accuracy test, and the temperature 1106 for which the error offsets will be estimated. The supply pressure 1108 for which the error offset will be estimated may also be input. The software implemented on the ASIC 1100 may use the input data to determine the FST factor, and may provide as output 1110 a series of pressure error offsets, such as a single column of the data shown in FIG. 6. The offsets may correspond to the calculated FST factor. Alternatively, the software my add the pressure error offsets to the pressure error data indicated in the data 1104 for the pressure accuracy test, and may provide as output 1110 the estimated pressure error as a function of command pressure, like the data 702 shown in FIG. 7.

A manufacturer of solenoid fluid control valves may provide the software to a customer. The data shown in FIGS. 2 and 3 may also be provided to the customer for each solenoid fluid control valve. The customer may then use the software and the data to estimate a device's command pressure accuracy. This eliminates the need for the manufacturer and/or the customer to measure the device's accuracy at multiple temperatures. Instead, a single current sweep and accuracy analysis may be performed at a characteristic temperature, and accuracy information for other temperatures may be determined based on the current sweep and accuracy analysis.

What is claimed is:

1. A method for determining off-temperature accuracy information of a solenoid fluid control valve, the method comprising:
    performing a current sweep at a first temperature, the current sweep comprising supplying, by a variable current source, a first current to a coil of the solenoid fluid control valve, changing the first current, and recording at least one resulting control pressure;
    for at least one command pressure, determining an error in a control pressure at the first temperature based on the current sweep by determining a command current corresponding to the at least one command pressure based on the current sweep, supplying the command current to the solenoid fluid control valve, and measuring a resulting control pressure;
    calculating a metric based on the current sweep; and
    determining a pressure error offset for a second temperature based on the metric.

2. The method of claim 1, wherein determining the error in the control pressure further comprises determining a difference between the at least one command pressure and the resulting control pressure.

3. The method of claim 1, wherein the first temperature is a normal operating temperature of the solenoid fluid control valve.

4. The method of claim 1, wherein the current sweep is performed for a supply pressure of the solenoid fluid control valve that is a normal operating supply pressure of the solenoid fluid control valve.

5. The method of claim 1, wherein performing the current sweep comprises increasing the first current supplied to the solenoid fluid control valve and measuring a control pressure and a fluid flow as a function of the current.

6. The method of claim 5 wherein the calculating the metric comprises determining an average slope of a liftoff region of the control pressure as a function of the first current.

7. The method of claim 6 wherein the liftoff region is bounded by a command current required to open the solenoid fluid control valve, and the command current corresponding to a peak flow through the solenoid fluid control valve.

8. The method of claim 7, wherein the calculating the metric further comprises determining a maximum slope of the control pressure as a function of the first current.

9. The method of claim 8, wherein the calculating the metric further comprises determining a maximum value of the fluid flow.

10. The method of claim 9, wherein the metric is proportional to the average slope of the liftoff region and the maximum value of the fluid flow, and inversely proportional to the maximum slope.

11. The method of claim 1, wherein the pressure error offset is determined based on a look-up table.

12. The method of claim 11, wherein the look-up table contains an average of measured data from a plurality of solenoid fluid control valves.

13. The method of claim 12, wherein the data is measured at the second temperature.

14. The method of claim 12, wherein each of the plurality of solenoid fluid control valves has a supply pressure, and wherein each supply pressure is the same.

15. The method of claim 14, wherein the current sweep is performed for a first supply pressure of the solenoid fluid control valve, and wherein the supply pressure of each the plurality of solenoid fluid control valves is different from the first supply pressure.

16. The method of claim 1 where the determining the pressure error offset for the second temperature comprises taking an average of values determined from a look-up table.

17. The method of claim 1 wherein the pressure error offset describes a difference between the error in control pressure at the first temperature and an expected error in control pressure at the second temperature.

18. The method of claim 1, further comprising adding the pressure error offset to the error in control pressure at the first temperature to determine an expected error in control pressure at the second temperature.

19. The method of claim 18, wherein the expected error in control pressure at the second temperature describes an expected difference between the at least one command pressure and the control pressure resulting from a command current corresponding to the at least one command pressure supplied to the solenoid fluid control valve at the second temperature.

* * * * *